(12) United States Patent
Fukaya et al.

(10) Patent No.: US 8,235,868 B2
(45) Date of Patent: Aug. 7, 2012

(54) CLUTCH CONTROL APPARATUS FOR VEHICLE

(75) Inventors: Kazuyuki Fukaya, Saitama (JP); Takashi Ozeki, Saitama (JP); Yoshiaki Tsukada, Saitama (JP); Hiroyuki Kojima, Saitama (JP); Yoshiaki Nedachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 700 days.

(21) Appl. No.: 12/259,060

(22) Filed: Oct. 27, 2008

(65) Prior Publication Data

US 2009/0111653 A1  Apr. 30, 2009

(30) Foreign Application Priority Data

Oct. 30, 2007  (JP) .................................. 2007-282182
Oct. 30, 2007  (JP) .................................. 2007-282183

(51) Int. Cl.
   *F16H 61/26*  (2006.01)
(52) U.S. Cl. ........................................ 477/127; 477/143
(58) Field of Classification Search .................. 477/174, 477/127, 143
   See application file for complete search history.

(56) References Cited

U.S. PATENT DOCUMENTS

| | | | | |
|---|---|---|---|---|
| 6,077,186 A * | 6/2000 | Kojima et al. | | 477/3 |
| 6,565,482 B2 * | 5/2003 | Kobayashi et al. | | 477/174 |
| 6,569,060 B2 * | 5/2003 | Rosi et al. | | 477/156 |
| 6,672,990 B2 * | 1/2004 | Netzer | | 477/156 |
| 6,692,409 B2 * | 2/2004 | Fukumoto et al. | | 477/174 |
| 7,003,388 B2 * | 2/2006 | Nakamura | | 701/67 |
| 7,043,347 B2 * | 5/2006 | Inoue et al. | | 701/67 |
| 7,108,632 B2 * | 9/2006 | Takagi et al. | | 477/70 |
| 7,181,327 B2 * | 2/2007 | Lee | | 701/51 |
| 7,604,569 B2 * | 10/2009 | Lee | | 477/127 |
| 7,670,257 B2 * | 3/2010 | Popp et al. | | 477/6 |

FOREIGN PATENT DOCUMENTS

JP  59-219549 A  12/1984
JP  63-161036  10/1988

\* cited by examiner

*Primary Examiner* — David D Le
*Assistant Examiner* — Jacob S Scott
(74) *Attorney, Agent, or Firm* — Birch, Stewart, Kolasch & Birch, LLP

(57) ABSTRACT

A clutch control apparatus for a vehicle provided with a hydraulic clutch in the middle of a power transmission path between an engine and a drive wheel. Before the clutch of the vehicle is brought into an engagement state, intermittent hydraulic pressure Y is applied to the clutch while maintaining the clutch in a disengagement state, and thereafter a predetermined hydraulic pressure is applied to the clutch to bring it into the engagement state. A solenoid valve is provided to control hydraulic pressure supplied to the clutch. Before the clutch is brought into the engagement state, a pulsed drive current D is supplied to the solenoid valve. The clutch control apparatus so configured suppresses a motion delay at the time of engaging the clutch, thereby allowing a quick and smooth start and shifting of the clutch.

8 Claims, 8 Drawing Sheets

CLUTCH CONTROL APPARATUS FOR VEHICLE

CROSS-REFERENCE TO RELATED APPLICATION

The present application claims priority under 35 U.S.C. §119 to Japanese Patent Application Nos. 2007-282182 and 2007-282183, both filed Oct. 30, 2007, the entire contents of which are hereby incorporated by reference.

BACKGROUND OF THE INVENTION

1. Field of the Invention

The present invention relates to a clutch control apparatus for a vehicle.

2. Description of Background Art

Conventionally, there is known a clutch control apparatus for a vehicle provided with a hydraulic clutch that is disposed in the middle of a power transmission path between an engine and a drive wheel and brought into an engagement state by hydraulic pressure supplied from the outside. This apparatus supplies a pulsed drive current to a solenoid valve adapted to control hydraulic pressure supplied to the clutch, in order to gradually bring the clutch into the engagement state (see e.g. Japanese Patent Laid-open No. Sho 59-219549, and Japanese Utility Model Publication No. Sho 63-161036.

However, the clutch control apparatus described above may sometimes cause delay resulting from the effect of response of the solenoid valve during from the start of the clutch engagement motion to the actual clutch engagement state. Thus, it is difficult to execute quick and smooth start and shifting. In addition, its tendency is easily-noticeable, particularly, at the time of starting on the slope or of suddenly opening the throttle valve. Such points need to be improved.

SUMMARY AND OBJECTS OF THE INVENTION

Accordingly, it is an object of the present invention to suppress a motion delay at the time of engaging a clutch to allow quick and smooth start and shifting in a clutch control apparatus for a vehicle provided with a hydraulic clutch in the middle of a power transmission path between an engine and a drive wheel.

According to an embodiment of the present invention, a clutch control apparatus is provided for a vehicle (e.g. the motorcycle 1 in the embodiment) having a hydraulic clutch (e.g. the twin clutch 26 in the embodiment) disposed in the middle of a power transmission path between an engine (e.g. the engine 13 in the embodiment) and a drive wheel (e.g. the rear wheel 11 in the embodiment). The clutch is brought into an engagement state by hydraulic pressure supplied from the outside. Before the clutch is brought into the engagement state, intermittent hydraulic pressure (e.g. the hydraulic pressure Y in the embodiment) is applied to the clutch while maintaining the clutch in a disengagement state, and thereafter a predetermined hydraulic pressure is applied to the clutch to bring the clutch into the engagement state.

According to an embodiment of the present invention, a solenoid valve (e.g. the clutch actuators 91a, 91b in the embodiment) is adapted to control hydraulic pressure supplied to the clutch, and the hydraulic pressure supplied to the clutch is controlled by controlling an electric current supplied to the solenoid valve.

According to an embodiment of the present invention, before the clutch is brought into the engagement state, a pulsed drive current (e.g. the drive current D in the embodiment) is supplied to the solenoid valve.

According to an embodiment of the present invention, an amplitude value of the pulsed drive current is gradually reduced.

According to an embodiment of the present invention, a clutch control apparatus is provided for a vehicle (e.g. the motorcycle 1 in the embodiment) having a hydraulic clutch (e.g. the twin clutch 26 in the embodiment) disposed in the middle of a power transmission path between an engine (the engine 13 in the embodiment) and a drive wheel (e.g. the rear wheel 11 in the embodiment). The clutch is brought into an engagement state by hydraulic pressure supplied from the outside, and the clutch control apparatus includes a solenoid valve (e.g. the clutch actuators 91a, 91b in the embodiment) adapted to control hydraulic pressure supplied to the clutch. A throttle sensor (e.g. the throttle sensor TS in the embodiment) is provided for detecting an opening angle of a throttle valve of the engine. When the clutch is to be brought into the engagement state, if the opening angle of the throttle valve is not less than a predetermined value, a drive current of one pulse (e.g. the drive current D2 in the embodiment) is supplied to the solenoid valve, and thereafter, a predetermined current is supplied to the solenoid valve to thereby shift the clutch into the engagement state.

According to an embodiment of the present invention, the throttle sensor detects the opening angle and opening rate of the throttle valve of the engine, and when the clutch is to be brought into the engagement state, if the opening angle and opening rate of the throttle valve are not less than respective predetermined values, the drive current of one pulse is supplied to the solenoid valve, and thereafter, a predetermined current is supplied to the solenoid valve to thereby shift the clutch into the engagement state.

According to an embodiment of the present invention, a control current for the solenoid valve increases and decreases in proportion to the opening rate of the throttle valve.

According to an embodiment of the present invention, the hydraulic pressure supplied to the clutch by the drive current of one pulse is such a degree as not to bring the clutch into the engagement state.

According to an embodiment of the present invention, the clutch is a twin clutch of a twin clutch speed-change control system which switches a speed step by switching a pair of clutch main bodies (e.g. the clutches 51a, 51b in the embodiment).

As a result of the embodiment of the present invention, the pulsation is appropriately applied to the hydraulic pressure supplied to the clutch in the disengagement state, by the supply of the intermittent hydraulic pressure. Thus, the motion delay at the time of engaging the clutch is suppressed to allow quick and smooth start and shifting, which enhances the drivability of the vehicle.

In addition, as a result of the embodiment of the present invention, the hydraulic pressure supplied to the clutch can be controlled easily and reliably.

Further, as a result of the embodiment of the present invention, since the appropriate pulsation can be applied to the hydraulic pressure supplied to the clutch, the delay of the engagement motion of the clutch can efficiently be suppressed.

Still further, as a result of the embodiment of the present invention, the initial motion of the clutch engagement is accelerated and thereafter the hydraulic pressure pulsation can gradually be suppressed. Thus, the engagement motion of the clutch can quickly be executed by the stable hydraulic pressure. In addition, the power consumption of the solenoid valve can further be reduced.

Still further, as a result of the embodiment of the present invention, when the clutch is to be brought into the engagement state, if the opening angle of the throttle valve is not less than the predetermined value, the drive current of one pulse is supplied to the solenoid valve to bleed air from and apply pre-pressurization to the inside of the clutch and of a hydraulic passage connected to the clutch. Thereafter, the predetermined current is supplied to the solenoid valve to thereby supply the predetermined hydraulic pressure to the clutch, bringing it into the engagement state. Thus, the motion delay at the time of engaging the clutch is suppressed to allow quick and smooth start and shifting, which enhances the drivability of the vehicle.

Still further, as a result of the embodiment of the present invention, when the clutch is to be brought into the engagement state, if the opening angle and opening rate of the throttle valve is not less than the respective predetermined values, the drive current of one pulse is supplied to the solenoid valve, and thereafter, the predetermined current is supplied to the solenoid valve to thereby bring the clutch into the engagement state. Thus, the motion delay at the time of engaging the clutch can more accurately be suppressed to thereby enhance the drivability of the vehicle.

Still further, as a result of the embodiment of the present invention, the hydraulic pressure supplied to the clutch can accurately be controlled in proportion to the opening rate of the throttle valve.

Still further, as a result of the embodiment of the present invention, the motion delay at the time of engaging the clutch can efficiently be suppressed.

Still further, as a result of the embodiment of the present invention, the twin clutch in which the stand-by state is able to be present before the clutch engagement can suppress the motion delay at the time of switching the clutches to smooth the engagement motion of the clutch, thereby enhancing the drivability of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6(a) illustrating those to which the control of the embodiment is applied, and FIG. 6(b) illustrating those to which the control of the embodiment is not applied;

DETAILED DESCRIPTION OF THE PREFERRED EMBODIMENTS

Figure 1:
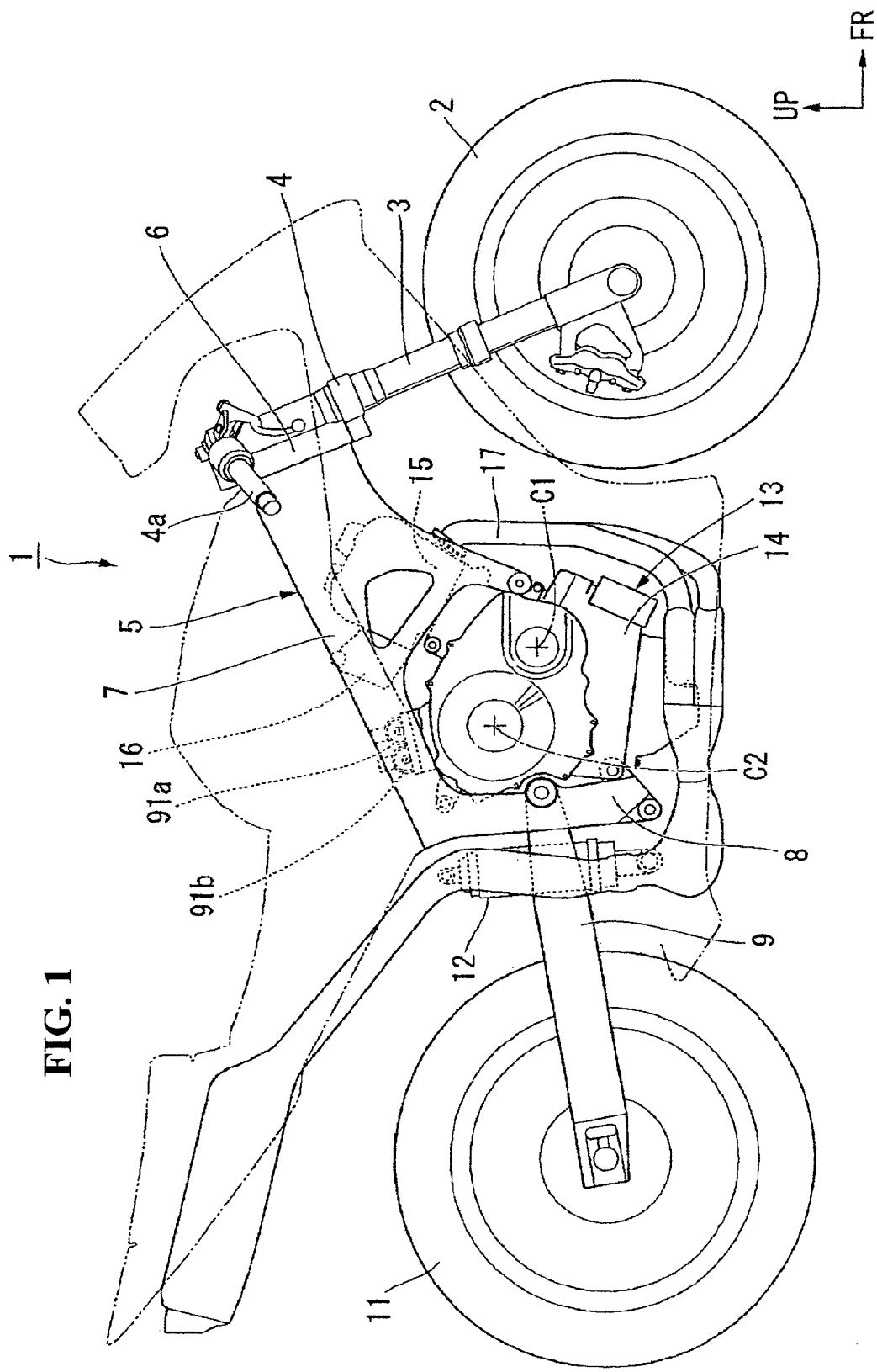
FIG. 1 is a right lateral view of a motorcycle according to an embodiment of the present invention.

It is to be noted that orientations such as the front, back or rear, left, right, etc. in the following description are the same as that of a vehicle unless otherwise explained. In addition, arrows FR, LH, UP in the drawings denote the front, left and upside, respectively, of the vehicle.

With reference to FIG. 1, a front wheel 2 of a motorcycle (a saddle-ride type vehicle) 1 is rotatably supported by a front fork 3. The front fork 3 is steerably supported at its upper portion by a head pipe 6 via a steering stem 4. The head pipe 6 is located at the front end of a body frame 5. Steering handlebars 4a are attached to the upper portion of the steering stem 4 (or the front fork 3). A main frame 7 extends rearward from the head pipe 6 and connects with a pivot plate 8. The front end of a swing arm 9 is up and down swingably supported by the pivot plate 8. A rear wheel 11 is rotatably supported by the rear end of the swing arm 9. A shock absorber 12 is interposed between the swing arm 9 and the body frame 5. An engine (an internal combustion engine) 13 which is a prime mover of the motorcycle 1 is suspended inside the body frame 5.

Figure 2:
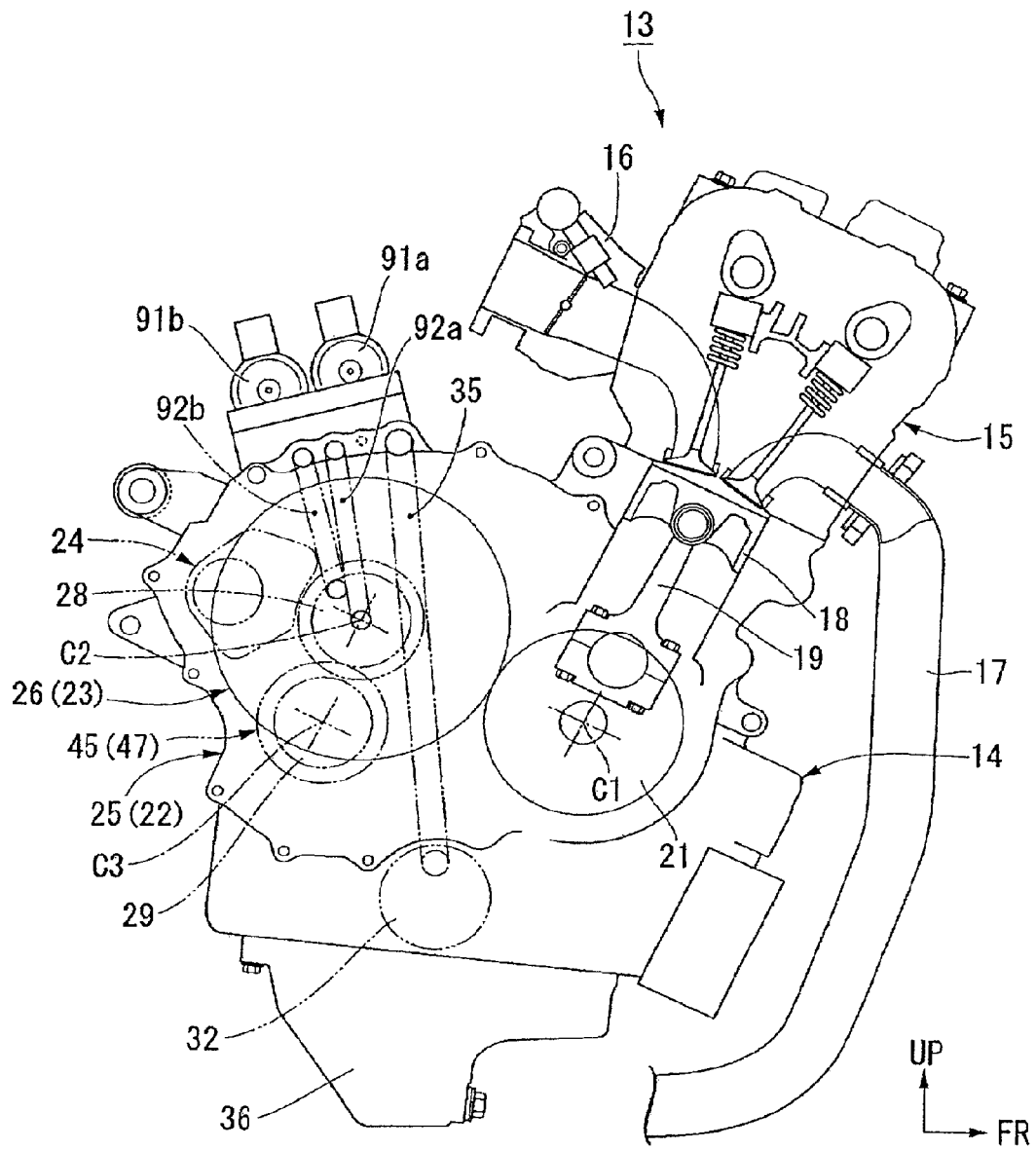
FIG. 2 is a right lateral view of an engine of the motorcycle.

With reference to FIG. 2, the engine 13 is a parallel four-cylinder engine in which a rotational center axis C1 of a crankshaft 21 extends along the vehicle-width direction (the left-right direction). A cylinder 15 is provided on the crankcase 14 to extend upward therefrom. A piston 18 associated with each cylinder is fitted into the cylinder 15 in a reciprocative manner. The reciprocation of each piston 18 is converted into the rotation of the crankshaft 21 via a connecting rod 19. A throttle body 16 is connected to the rear of the cylinder 15 and an exhaust pipe 17 is connected to the front of the cylinder 15.

A transmission case 22 is integrally joined to the rear of the crankcase 14. A twin clutch transmission 23 and a gear change mechanism 24 are accommodated in the transmission case 22. A right lateral portion of the transmission case 22 is a clutch case 25 in which a twin clutch 26 of the twin clutch transmission 23 is accommodated. The rotational power of the crankshaft 21, the power source of the engine 13, is outputted from the left side of the transmission case 22 via the transmission 23 and then transmitted to the rear wheel 11 via e.g. a chain type power transmission mechanism. Incidentally, symbols C2 and C3 denote a rotational center axis of a main shaft 28 and that of a counter shaft 29, respectively, in the transmission 23.

Figure 3:
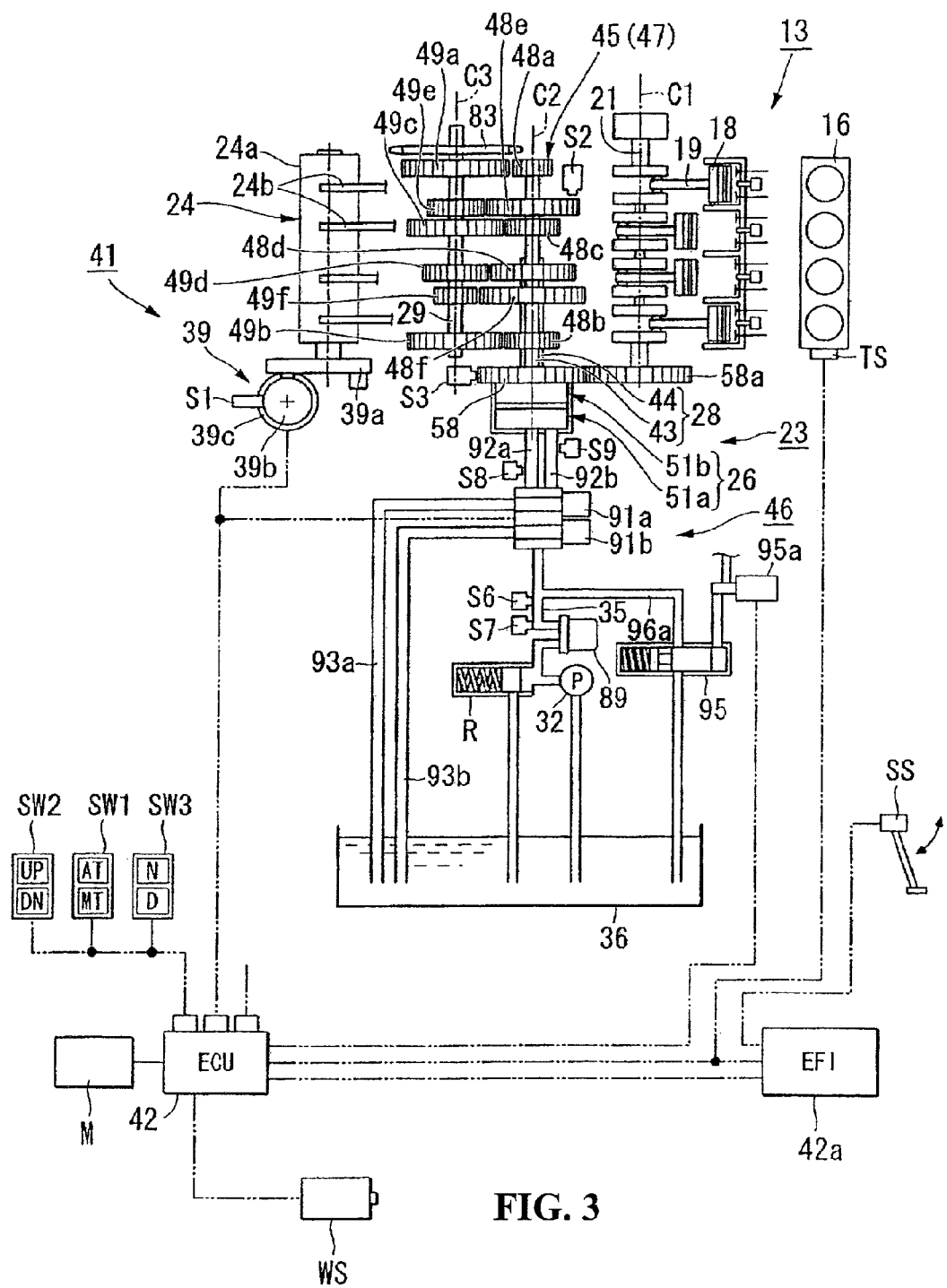
FIG. 3 is a block diagram of a twin clutch type speed-change control system of the motorcycle.

With reference to FIG. 3, the motorcycle 1 is provided with a twin clutch speed-change control system mainly including the twin clutch transmission 23 provided contiguously with the engine 13, a gear shifting device 41 composed of the gear change mechanism 24 and a drive mechanism 39 attached thereto, and an electronic control unit (ECU) 42 for operatively controlling the twin clutch transmission 23 and the gear shifting device 41.

Figure 4:
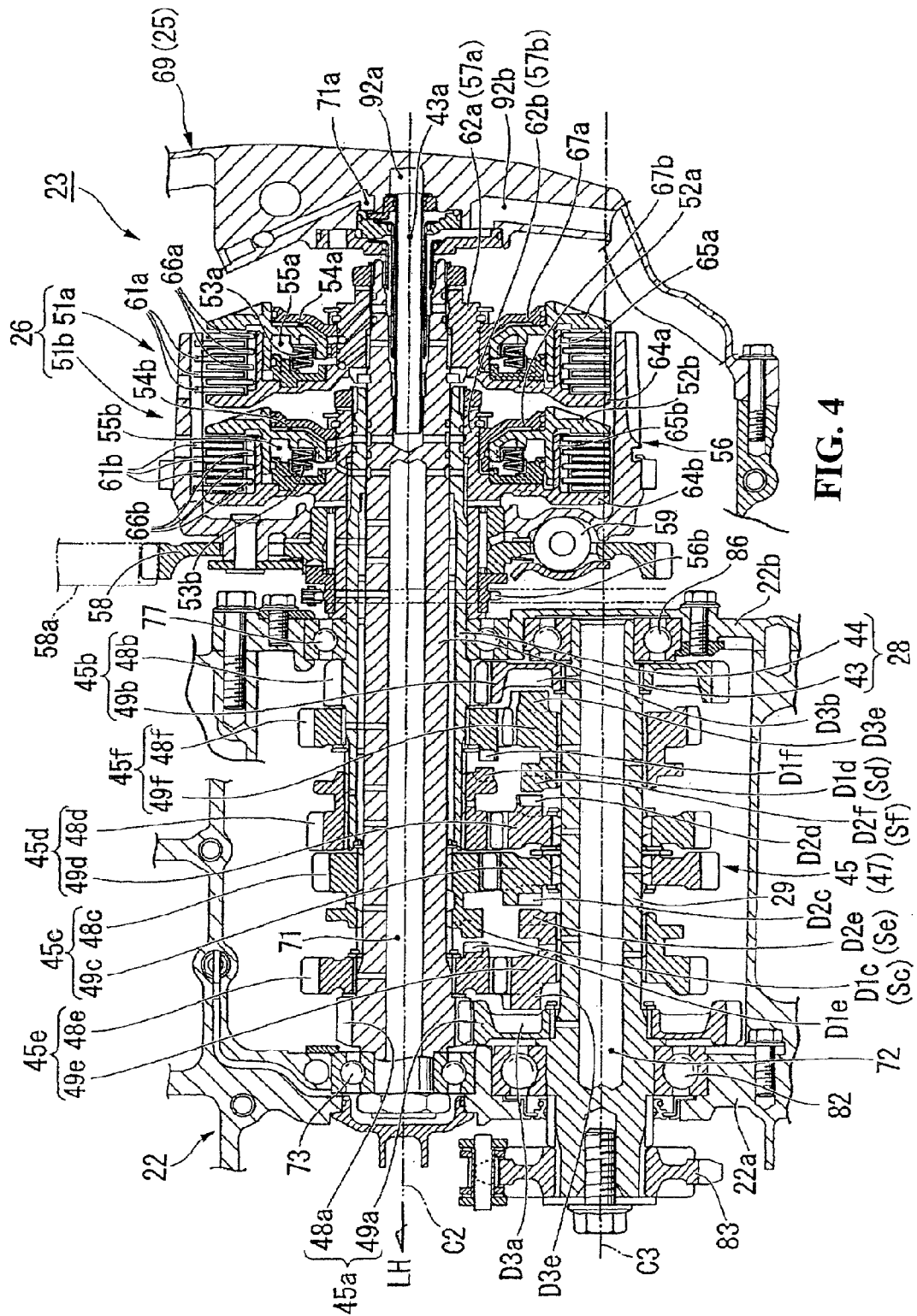
FIG. 4 is a cross-sectional view of a twin clutch type transmission of the motorcycle.

With additional reference to FIG. 4, the twin clutch transmission 23 includes the main shaft 28 which is of a dual structure composed of inner and out shafts 43, 44; a counter shaft 29 disposed parallel to the main shaft 28; a speed-change gear group 45 arranged to be spanned between the main shaft 28 and the counter shaft 29; the twin clutch 26 coaxially disposed at the right end of the main shaft 28; and a hydraulic pressure supply device 46 for supplying operative hydraulic pressure to the twin clutch 26. The assembly consisting of the main shaft 28, the counter shaft 29 and the speed-change gear group 45 are hereinafter called a transmission device 47.

The main shaft 28 is configured such that the right lateral portion of the inner shaft 43 spanned between the left and right of the transmission case 22 is inserted through the inside of the outer shaft 44 for relative rotation. Drive gears 48a to 48f for six speeds in the speed-change gear group 45 are dividedly arranged on the outer circumference of the inner and outer shafts 43, 44. On the other hand, driven gears 49a to 49f for six speeds in the speed-change gear group 45 are arranged on the outer circumference of the counter shaft 29. The drive gears 48a to 48f correspond to and are meshed with the driven gears 49a to 49f respectively, for respective speed steps so as to constitute respective speed gear pairs 45a to 45f correspondingly thereto. Incidentally, the speed gear pairs 45a to 45f are reduced in speed reducing ratio (become higher-speed gears) in the order from a first-speed to a sixth-speed.

The left end of the inner shaft 43 terminates at a left lateral wall 22a of the transmission case 22 and is rotatably supported by the left lateral wall 22a via a ball bearing 73.

On the other hand, a right lateral portion of the inner shaft 43 is passed through a right lateral wall 22b of the transmission case 22 and faces the inside of the clutch case 25. The left-right intermediate portion of the inner shaft 43 is rotatably supported by the right lateral wall 22b of the transmission case 22 via the left-right intermediate portion of the outer shaft 44 similarly passed through the right lateral wall 22b and via the ball bearing 77.

The outer shaft 44 is shorter than the inner shaft 43 and has a left end terminating at a left-right intermediate portion of the transmission case 22. The drive gears 48b, 48d, 48f corresponding to even speed steps (second, fourth and sixth speed) in the speed-change gear group 45 are carried by a portion of the outer shaft 44 located leftward of the right lateral wall 22b in the order of fourth-speed-use, sixth-speed-use and second-speed-use from the left. On the other hand, the drive gears 48a, 48c, 48e corresponding to odd speed steps (first, third and fifth speed) in the speed-change gear group 45 are carried by a portion of the inner shaft 43 located leftward of the left end of the outer shaft 44 in the order of first-speed-use, fifth-speed-use and third-speed-use from the left.

The left and right ends of the counter shaft 29 are rotatably carried by the left and right lateral walls 22a, 22b, respectively, of the transmission case 22 via the ball bearings 82, 86, respectively. The left end of the counter shaft 29 projects leftward from the left lateral wall 22a. A drive sprocket 83 of the power transmission mechanism to the rear wheel 11 is mounted to the left end of the counter shaft 29.

The driven gears 49a to 49f corresponding to the associated speed steps in the speed-change gear group 45 are carried by a portion of the counter shaft 29 located inward of the transmission case 22 in the same order as that of the drive gears 48a to 48f.

The main shaft 28 (the inner shaft 43) and the counter shaft 29 are internally formed with main oil supply passages 71 and 72, respectively, adapted to supply hydraulic pressure from a main oil pump (not shown) for supplying under pressure oil to the various portions of the engine 13. Engine oil is appropriately supplied to the speed-change gear group 45 via the main oil supply passage.

The twin clutch 26 is composed of first and second hydraulic disk clutches (hereinafter, may simply be called clutches) 51a, 51b disposed coaxially with and adjacently to each other. The inner and outer shafts 43, 44 are coaxially connected to the clutches 51a and 51b, respectively. A primary driven gear 58 meshed with a primary drive gear 58a of the crankshaft 21 is coaxially provided on a clutch outer 56 shared by the clutches 51a, 51b. The rotational drive power from the crankshaft 21 is transmitted to the clutch outer 56 via the gears 58, 58a. The rotational power transmitted to the clutch outer 56 is individually transmitted to the inner and outer shafts 43, 44 in response to the engagement/disengagement state of the clutches 51, 51b. The engagement/disengagement state of the clutches 51a, 51b is controlled by the presence or absence of hydraulic pressure supplied from the hydraulic pressure supply device 46.

One of the clutches 51a, 51b is brought into the engagement state and the other into the disengagement state. Any one of the speed gear pairs connected to one of the inner and outer shafts 43, 44 is used to execute power transmission in the transmission device 47. In addition, a speed gear pair to be subsequently used is previously selected from the speed gear pairs connected to the other of the inner and outer shafts 43, 44. From this state, one of the clutches 51a, 51b is brought into the disengagement state and the other into the engagement state. This allows the power transmission of the transmission device 47 to be switched to that using the previously selected speed gear pair. Thus, the transmission device 47 is upshifted or downshifted.

As shown in FIG. 3, the hydraulic pressure supply device 46 includes a clutch oil pump 32 which is a hydraulic pressure generation source for the twin clutch 26; an oil supply passage 35 extending from the discharge port of the clutch oil pump 32; first and second clutch actuators 91a, 91b connected to the downstream side of the oil supply passage 35; and first and second oil supply passages 92a and 92b extending from the clutch actuators 91a and 91b to connection side hydraulic chambers 54a and 54b (see FIG. 4) of the clutches 51a and 51b, respectively.

The clutch oil pump 32 is provided separately from the main oil pump to suck the engine oil in an oil pan 36 below the crankcase 14 and discharge it into the oil supply passage 35. The oil supply passage 35 is provided with an oil filter 89 dedicated to the oil supply passage.

Symbols S6 and S7 in the figure denote a hydraulic sensor and an oil temperature sensor for detecting the hydraulic pressure and oil temperature, respectively, in the oil supply passage 35. Symbol R denotes a relief valve for controlling an increase in the hydraulic pressure in the oil supply passage 35. Symbols S8 and S9 denote respective hydraulic sensors for detecting the hydraulic pressures in the oil supply passages 92a and 92b, i.e., hydraulic pressures supplied to the clutches 51a and 51b, respectively.

The oil supply passage 35 can individually communicate with each of the first and second supply oil passages 92a and 92b through the corresponding operation of clutch actuators 91a and 91b. If the oil supply passage 35 communicates with the first oil supply passage 92a via the first clutch actuator 91a, relatively high hydraulic pressure from the clutch oil pump 32 is supplied to the connection side hydraulic chamber 54a of the first clutch 51a via the first oil supply passage 92a to bring the first clutch 51a into the engagement state. On the other end, the oil supply passage 35 communicates with the second oil supply passage 92b via the second clutch actuator 91b, the hydraulic pressure from the clutch oil pump 32 is supplied to the connection side hydraulic chamber 54b of the second clutch 51b via the second oil supply passage 92b to bring the second clutch 51b into the engagement state.

A hydraulic pressure-relief oil passage 96a having a hydraulic pressure-relief valve 95 branches from the oil supply passage 35. The hydraulic pressure-relief valve 95 is actuated by a valve actuator 95a to switch between the opening and blocking of the hydraulic pressure-release oil passage 96. The valve actuator 95a is operatively controlled by the electronic control unit 42 to open the hydraulic pressure-release oil passage 96a when the engine is started, and return the feed hydraulic pressure from the clutch oil pump 32 to the oil pan 36. After the engine has been started, the hydraulic pressure-release oil passage 96a is blocked to enable the supply of the feed hydraulic pressure to the twin clutch 26.

The clutch actuators 91a and 91b are respectively provided with return oil passages 93a and 93b adapted to return the hydraulic pressure from the clutch oil pump 32 into the oil pan when the communication between the oil supply passage 35 and the first and second oil supply passages 92a, 92b is blocked.

Figure 5:
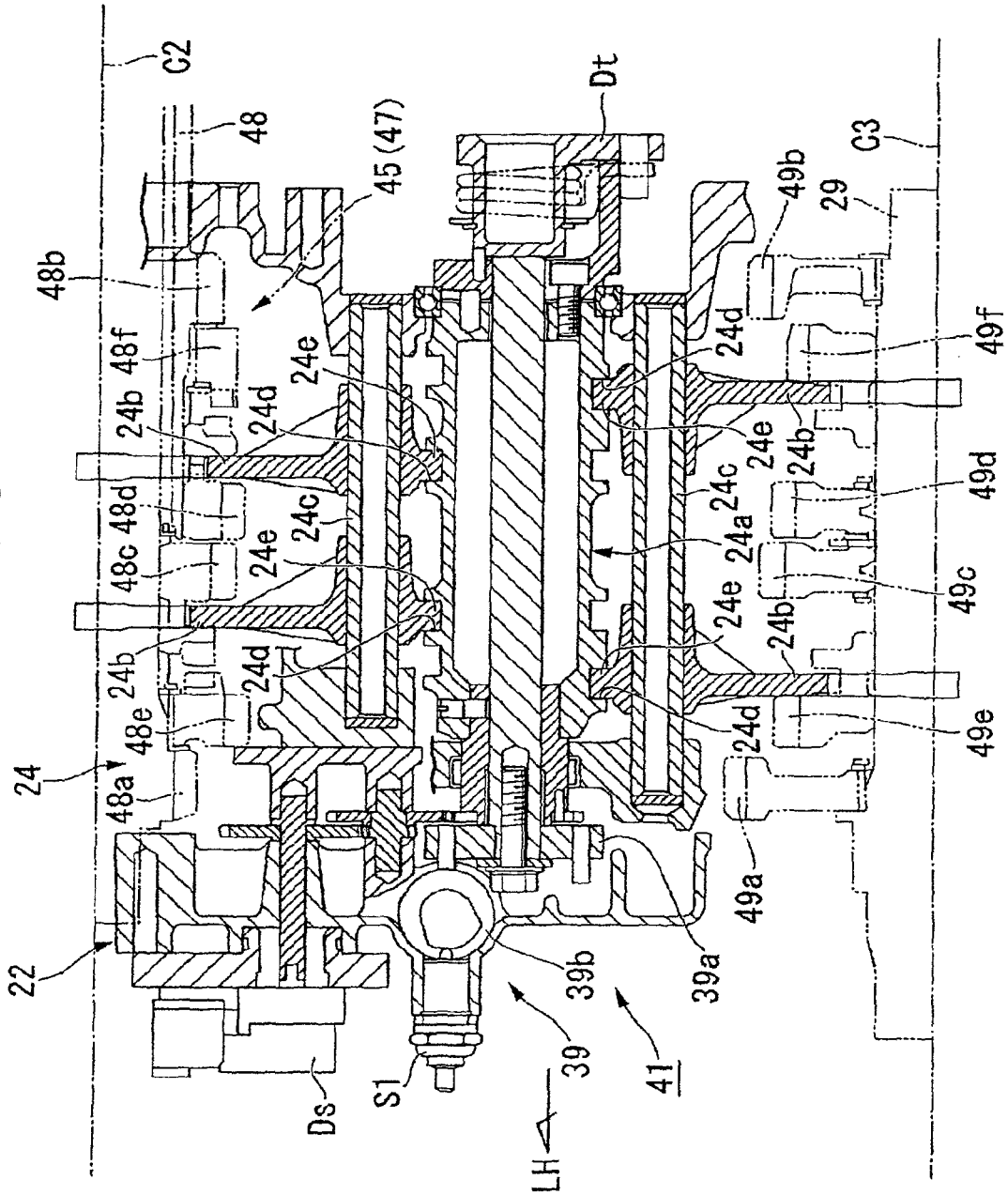
FIG. 5 is a cross-sectional view of a gear change mechanism adapted to operate the twin clutch transmission.

As shown in FIGS. 3 and 5, the gear change mechanism 24 axially shifts a plurality of (four in the embodiment) shift forks 24b by turning a shift drum 24a arranged parallel to the main shaft 28 and counter shaft 29, thereby switching the speed gear pair (the speed step) used to transmit power between the main shaft 28 and the counter shaft 29.

The shift forks 24b consist of a pair of ones extending toward the main shaft 28 and another pair of ones extending toward the counter shaft 29. The shift forks 24b are axially moveably carried by a pair of shift fork rods 24c at their proximal ends. The shift forks 24b are each provided at the proximal end with a sliding projection 24e engaged with any one of a plurality cam grooves 24d on the outer circumference of the shift drum 24a. The shift forks 24b have distal ends engaged with slide gears described later in the speed-change gear group 45 on the sides of the main shaft 28 and of the counter shaft 29. The shift drum 24a is turned to axially move the shift forks 24b along the patterns of the cam grooves 24d, which axially moves the slide gear, thereby changing the speed step of the transmission device 47.

The drive mechanism 39 is mounted to one end of the shift drum 24a. The drive mechanism 39 includes a pin gear 39a coaxially secured to the shift drum 24a of the gear change mechanism 24; a wormlike barrel cam 39b engaged with the pin gear 39a; and an electric motor 39c for applying a rotational drive force to the barrel cam 39b. The electric motor 39c is driven to appropriately turn the shift drum 24a, thereby changing the speed step of the transmission device 47.

In the figures, symbol S1 denotes a sensor for detecting the operation amount of the drive mechanism 39 in order to detect the speed step of the transmission device 47. Symbol DS denotes an operation angle sensor for detecting the actual operation angle of the shift drum 24a. Symbol DT denotes a detent for defining a turning angle for each speed step of the shift drum 24a.

As shown in FIG. 4, the transmission device 47 is of a constant-mesh type in which the drive gears 48a to 48f are constantly meshed with the driven gears 49a to 49f so as to be associated with the corresponding speed steps. Such gears are classified broadly into stationary gears capable of rotation integral with the corresponding support shafts (the shafts 28, 29); free gears capable of rotation relative to the corresponding support shafts; and slide gears capable of rotation integral with the corresponding shafts and of axial movement.

Specifically, the drive gears 48a, 48b are stationary gears, the drive gears 48c, 48d are slide gears and the drive gears 48e, 48f are free gears. In addition, the driven gears 49a-49d are free gears, and the driven gears 49e, 49f are slide gears. Hereinafter, the gears 48c, 48d, 49e, 49f are called slide gears and the gears 48e, 48f, 49a-49d are called free gears.

Any slide gear is appropriately slid (axially moved) by the gear change mechanism 24 to enable power transmission using a speed gear pair associated with any corresponding speed step.

Slide rings Sc and Sd are provided at respective one ends of the slide gears 48c and 48d, respectively, similarly to those, so as to be capable of rotation integral with the corresponding shafts and of axial movement. The slide rings Sc and Sd are provided axially adjacently to the free gears 48e and 48f, respectively. The slide rings Sc and Sd are provided with slide-side dogs (dowels) D1c and D1d, respectively. The free gears 48e and 48f are provided with free-side dogs (dowels) D1e and D1f, respectively, associated with the slide-side dogs D1c and D1d, respectively.

Slide rings Se and Sf are provided at respective one ends of the slide gears 49e and 49f, respectively, similarly to those, so as to be capable of rotation integral with the corresponding shafts and of axial movement. The slide rings Se and Sf are provided axially adjacently to the free gears 49c and 49d, respectively. The slide rings Se and Sf are provided with slide-side dogs (dowels) D2e and D2f, respectively. The free gears 49c and 49d are provided with free-side dogs (dowels) D2c and D2d, respectively, associated with the slide-side dogs D2e and D2f, respectively.

Further, the slide gears 49e and 49f are provided on the other side with slide-side dogs (dowels) D3e and D3f, respectively. The free gears 49a and 49b axially adjacent to the slide-side dogs D3e and D3f, respectively, are provided with free-side dogs (dowels) D3a and D3b, respectively, associated with the slide-side dogs D3e and D3f, respectively.

When the slide gear (including the slide ring) approaches the corresponding free gear, the slide-side dog is engaged with the corresponding free-side dog so as to be incapable of relative rotation. When the slide gear is separate from the corresponding free gear, the engagement between the slide-side dog and the corresponding free-side dog is released.

Any one of the slide gears is engaged with the corresponding free gear through the associated dogs so as to be incapable of relative rotation, which enables power transmission selectively using any one of the speed gear pairs between the main shaft 28 and the counter shaft 29.

In the state where the engagements between the slide gears and the corresponding free gears are wholly released (in the state shown in FIG. 4), the power transmission between both the shafts 28, 29 becomes impossible. This state is a neutral state of the transmission device 47.

As shown in FIG. 3, the electronic control unit 42 controls the operation of the twin clutch transmission 23 and of the gear shifting device 41 on the basis of information from sensors and switches mentioned below in addition to the sensors mentioned earlier to change the speed steps (the shift positions) of the transmission device 47. The sensors include an opening-angle sensor TS of a throttle valve in the throttle body 16, a storage sensor (switch) SS of a side stand (or a center stand), and a wheel-speed sensor WS of the front wheel 2. The switches include a mode switch SW1 provided on the steering handlebar 4a, a gear selector switch SW2 and a neutral-drive selector switch SW3.

The speed mode selected by the mode switch SW1 is a full-automatic mode or a semi-automatic mode. The full-automatic mode is such that the speed step of the transmission device 47 is automatically switched on the basis of vehicle information such as vehicle-speed (wheel speed), engine speed, etc. The semi-automatic mode is such that the speed step of the transmission device 47 is made switchable only by the operation of the selector switch SW2 on the basis of rider's intention. A current speed mode and a speed step are indicated on a meter device mounted e.g. near the steering handlebar 4a. The operation of the neutral-drive switch SW3 allows the transmission device 47 to be switchable between a neutral state and a state where power transmission can be executed at a predetermined speed step.

In the figures, symbol S2 denotes a vehicle speed sensor for detecting the rotation number of the main shaft 28 for detecting the vehicle speed (for detecting the rotation number of the drive gear 48e meshed with the driven gear 49e rotating integrally with the counter shaft 29). Symbol S3 denotes a rotation number sensor for detecting the rotation number of the primary driven gear 58 for detecting the engine speed (the rotation number of the crankshaft 21). The electronic control unit 42 shares the information from the sensors with an ECU 42a for a fuel injector.

As shown in FIG. 4, the twin clutch 26 is such that the first clutch 51a connected to the speed gear pairs for odd speed steps is arranged on the right (on the outside in the vehicle-width direction) inside the clutch case 25 and the second clutch 51b connected to the speed gear pairs for even speed steps is arranged on the left (on the inside in the vehicle-width direction) inside the clutch case 25. The clutches 51a, 51b are wet-type multiple disk clutches having a plurality of clutch plates (clutch disks 61a, 61b and clutch plates 66a, 66b) axially alternately overlapping each other.

The clutches 51a and 51b are of a hydraulic type in which pressure plates 52a, 52b are axially displaced by hydraulic pressure fed from the outside to provide a predetermined engaging force. The clutches 51a and 51b include return springs 53a and 53b, connection side hydraulic chambers 54a and 54b and disconnection side hydraulic chambers 55a and 55b, respectively. The return springs 53a and 53b are adapted to bias the pressure plates 52a and 52b, respectively, to disengage the corresponding clutches. The connection side hydraulic chambers 54a and 54b are adapted to apply a pressing force to the pressure plates 52a and 52b, respectively, to engage the corresponding clutches. The disconnection side hydraulic chambers 55a and 55b are adapted to apply a pressing force to the pressure plates 52a and 52b, respectively, to disengage the corresponding clutches to assist the returning operation of the pressure plates 52a and 52b.

Relatively low hydraulic pressure is constantly, selectively and individually fed from the main oil pump to the disconnection side hydraulic chambers 55a, 55b. Relatively high hydraulic pressure is selectively and individually fed from the hydraulic pressure supply device 46 (the clutch oil pump 32) to the connection side hydraulic chambers 54a, 54b.

The clutches 51a, 51b share the single clutch outer 56 and are constructed to have almost the same diameter. The clutch outer 56 is formed in a rightward opening, bottomed-cylindrical shape and has a bottom central portion carried by the left-right intermediate portion of the outer shaft 44 so as to be capable of relative rotation. A clutch center 57a for the first clutch 51a is disposed on the leftward inside of the clutch outer 56 and a clutch center 57b for the second clutch 51b disposed on the rightward inside of the clutch outer 56. The clutch center 57a is carried by the right end of the inner shaft 43 so as to be capable of integral rotation. The clutch center 57b is carried by the right end of the outer shaft 44 so as to be capable of integral rotation.

The primary driven gear 58 is attached to the left side of the bottom of the clutch outer 56 via spring dampers 59. The primary driven gear 58 is meshed with the primary drive gear 58a of the crankshaft 21. Thus, the rotational force of the crankshaft 21 is applied to the clutch outer 56 via the spring dampers 59. The clutch outer 56 is rotated along with the rotation of the crankshaft 21 separately from the rotation of the main shaft 28.

A drive sprocket 56b for driving the oil pumps is integrally rotatably provided on the clutch outer 56 so as to be located on the left side of the primary driven gear 58. A plurality of the clutch plates 61a for the first clutch 51a are integrally rotatably carried by the rightward inner circumferential of the clutch outer 56. A plurality of the clutch plates 61b for the second clutch 51b are integrally rotatably carried by the leftward inner circumference of the clutch outer 56 so as to be capable integral rotation.

The clutch outer 56 is formed on the outer circumference with a plurality of engaging grooves in the axial direction. The clutch plates 61a, 61b are formed on the outer circumference with a plurality of engaging projections corresponding to the respective engaging grooves. The engaging projections are each engaged with a corresponding one of the engaging grooves so that the clutch plates 61a, 61b are integrally rotatably carried by the clutch outer 56.

An inner wall 65a is provided on a flange portion 64a on the left side of the clutch center 57a of the first clutch 51a so as to extend rightward. A plurality of the clutch disks (the friction plates) 66a are integrally rotatably carried by the outer circumference of the inner wall portion 65a.

The clutch center 57a is formed on the outer circumference with a plurality of engaging grooves arranged in the axial direction. The clutch disks 66a are formed on the inner circumference with a plurality of respective engaging projections associated with the corresponding engaging grooves. The engaging projections are each engaged with a corresponding one of the engaging grooves so as to be incapable of relative rotation. Thus, the clutch disks 66a are carried by the clutch center 57a so as to be capable of integral rotation.

The pressure plate 52a is disposed oppositely to and rightward of the flange portion 64a. The clutch plates 61a and the clutch disks 66a are disposed between the outer circumferential side of the pressure plate 52a and the outer circumferential side of the flange portion 64a in the laminated state where they axially overlap each other.

The disconnection side hydraulic chamber 55a is defined between the inner circumferential side of the pressure plate 52a and the inner circumferential side of the flange portion 64a. The return spring 53a is disposed in the disconnection side hydraulic chamber 55a so as to bias the pressure plate 52a rightward (the side separate from the flange portion 64a, on the clutch disengagement side).

A support flange portion 67a is provided on the outer circumference of a central cylindrical portion 62a on the right side of the clutch center 57a. In addition, the support flange portion 67a is disposed rightward of and oppositely to the inner circumferential side of the pressure plate 52a. The connection side hydraulic chamber 54a is defined between the support flange portion 67a and the inner circumferential side of the pressure plate 52a. The return spring 53a is disposed in the connection side hydraulic chamber 54a.

On the other hand, an inner wall 65b is provided on a flange portion 64b on the left side of the clutch center 57b of the second clutch 51b so as to extend rightward. A plurality of the clutch disks 66b are integrally rotatably carried by the outer circumference of the inner wall portion 65b.

The clutch center 57b is formed on the outer circumference with a plurality of engaging grooves arranged in the axial direction. The clutch disks 66b are formed on the inner circumference with a plurality of respective engaging projections associated with the corresponding engaging grooves. The engaging projections are each engaged with a corresponding one of the engaging grooves so as to be incapable of relative rotation. Thus, the clutch disks 66b are carried by the clutch center 57b so as to be capable of integral rotation.

The pressure plate 52b is disposed oppositely to and rightward of the flange portion 64b. The clutch plates 61b and the clutch disks 66b are disposed between the outer circumferential side of the pressure plate 52b and the outer circumferential side of the flange portion 64b in the laminated state where they axially overlap each other.

The disconnection side hydraulic chamber 55b is defined between the inner circumferential side of the pressure plate 52b and the inner circumferential side of the flange portion 64b. The return spring 53b is disposed in the disconnection side hydraulic chamber 55a so as to bias the pressure plate 52b rightward (the side separate from the flange portion 64b, on the clutch disengagement side).

A support flange portion 67b is provided on the outer circumference of a central cylindrical portion 62b on the right side of the clutch center 57b. In addition, the support flange portion 67b is disposed rightward of and oppositely to the inner circumferential side of the pressure plate 52b. The connection side hydraulic chamber 54b is defined between the support flange portion 67b and the inner circumferential side of the pressure plate 52b. The return spring 53b is disposed in the connection side hydraulic chamber 54b.

A clutch cover 69 constituting a right side portion of the clutch case 25 is provided with first and second oil supply passages 92a, 92b and with an in-cover main oil supply passage 71a. Respective oil passages communicating with the oil passages 92a, 92b and 71a are appropriately formed in a right hollow portion 43a of the inner shaft 43.

Hydraulic pressure can be supplied from the clutch oil pump 32 through the second oil supply passage 92b and the like to the connection side hydraulic pressure chamber 54b of the second clutch 51b. Hydraulic pressure can be supplied from the main oil pump through the in-cover main oil supply passage 71a and the like to the disconnection side hydraulic chamber 55a. Hydraulic pressure can be supplied from the clutch oil pump 32 through the first oil supply passage 92a and the like to the connection side hydraulic pressure 54a of the first clutch 51. Incidentally, hydraulic pressure can be supplied from the main oil pump through the main oil supply passage 71 and the like to the disconnection side hydraulic chamber 55b of the second clutch 51.

In the engine-stopped state (the oil pumps-stopped state), the pressure plate 52a is displaced rightward by the biasing force of the return spring 53a to bring the clutch 51a into the clutch disengagement state where the frictional engagement between the clutch plates 61a and the clutch disks 66a is released. Similarly, the pressure plate 52b is displaced rightward by the biasing force of the return spring 53b to bring the clutch 51b into the clutch disengagement state where the frictional engagement between the clutch plates 61b and the clutch disks 66b is released. Even in the engine-operating state and in the state where the hydraulic pressure supply from the hydraulic pressure supply device 46 is stopped, the biasing force of the return spring 53a and the hydraulic pressure from the disconnection side hydraulic chamber 55a are applied to the pressure plate 52a to bring the clutch 51a into the clutch disengagement state similarly to the above. Likewise, the biasing force of the return spring 53b and the hydraulic pressure from the disconnection side hydraulic chamber 55b are applied to the pressure plate 52b to bring the clutch 51b into the clutch disengagement state.

On the other hand, for the first clutch 51a, in the engine operating state and in the state where relatively high hydraulic pressure is supplied from the hydraulic pressure supply device 46 to the connection side hydraulic chamber 54a, the pressure plate 52a is moved leftward (toward the flange portion 64a, toward the clutch engagement side) against the hydraulic pressure of the disconnection side hydraulic pressure 55a and against the biasing force of the return spring 53a. This allows the clutch plates 61a and the clutch disks 66a to be pressurized with each other for frictional engagement therebetween, which brings the first clutch 51a into the clutch engagement state where torque transmission can be enabled between the clutch outer 56 and the clutch center 57a.

Likewise, for the second clutch 51b, in the engine operating state and in the state where relatively high hydraulic pressure is supplied from the hydraulic pressure supply device 46 to the connection side hydraulic chamber 54b, the pressure plate 52b is moved leftward (toward the flange portion 64b, toward the clutch engagement side) against the hydraulic pressure of the disconnection side hydraulic pressure 55b and against the biasing force of the return spring 53b. This allows the clutch plates 61b and the clutch disks 66b to be pressurized with each other for frictional engagement therebetween, which brings the first clutch 51b into the clutch engagement state where torque transmission can be enabled between the clutch outer 56 and the clutch center 57b.

The supply of hydraulic pressure to the connection side hydraulic chamber 54a from the engagement state of the clutch 51a may be stopped. In such a case, the pressure plate 52a is displaced leftward by the hydraulic pressure of the disconnection side hydraulic chamber 55a and by the biasing force of the return spring 53a to release the frictional engagement between the clutch plates 61a and the clutch disks 66a. This brings the clutch 51a into the clutch disengagement state where torque transmission is impossible between the clutch outer 56 and the clutch center 57a. Similarly, the supply of hydraulic pressure to the connection side hydraulic chamber 54b from the engagement state of the clutch 51b may be stopped. In such a case, the pressure plate 52b is displaced leftward by the hydraulic pressure of the disconnection side hydraulic chamber 55b and by the biasing force of the return spring 53b to release the frictional engagement between the clutch plates 61b and the clutch disks 66b. This brings the clutch 51b into the clutch disengagement state where torque transmission is impossible between the clutch outer 56 and the clutch center 57b.

The engine oil supplied to the disconnection side hydraulic chamber 55a of the clutch 51a is led to the outside of the hydraulic chamber via the oil passage appropriately formed in the inner wall portion 65a. Then, the engine oil is appropriately supplied to the clutch plates 61a and the clutch disks 66a on the outer circumference of the inner wall portion 65a. The hydraulic oil in the disconnection side hydraulic chamber 55a is released as described above. This can maintain the hydraulic pressure in the disconnection side hydraulic chamber 55a in a predetermined low-pressure state and improve the lubricating property and cooling property of the clutch plates 61a and clutch disks 66a of the clutch 51a in the disengagement state. Similarly, the engine oil supplied to the disconnection side hydraulic chamber 55b of the clutch 51b is led to the outside of the hydraulic chamber via the oil passage appropriately formed in the inner wall portion 65b. Then, the engine oil is appropriately supplied to the clutch plates 61b and the clutch disks 66b on the outer circumference of the inner wall portion 65b. The hydraulic oil in the disconnection side hydraulic chamber 55b is released as described above. This can maintain the hydraulic pressure in the disconnection side hydraulic chamber 55b in a predetermined low-pressure state and improve the lubricating property and cooling property of the clutch plates 61b and clutch disks 66b of the clutch 51b in the disengagement state.

In the twin clutch transmission 23, a judgment may be made that the motorcycle 1 is in a parking state because of e.g. the rising side stand or the like even after the engine of the motorcycle 1 has been started. In such a case, both the clutches 51a, 51b are maintained in the disengagement state. For example, if the side stand is stored or the switch SW1, SW2 or SW3 is operated, the transmission device 47 comes from the neutral state into the first-speed state where the power transmission is enabled by use of a first speed gear (the starting gear, speed gear pair 45a) for preparing the start of the motorcycle 1. For example, the engine speed increases from such a state to bring the first clutch 51a into the clutch engagement state through partial clutch engagement, thereby starting the motorcycle 1.

During the traveling of the motorcycle 1, only one, of the clutches 51a, 51b, corresponding to the current shift position, comes into the engagement state while the other remains in the disengagement state. Thus, power transmission is executed through one of the inner and outer shafts 43, 44 and through any one of the speed gear pairs 45a to 45f. In this case, the electronic control unit 42 controls the operation of the twin clutch transmission 23 on the basis of the vehicle information to create a state capable of power transmission by use of a speed gear pair corresponding to a subsequent shift position.

Specifically, if the current shift position (the speed step) is, for example, an odd step (or an even step), a subsequent shift position will be an even step (or an odd step). Thus, a state is previously created where power transmission using the speed gear pair of the even step (the odd step) is possible.

In this case, the first clutch 51a is in the engagement state but the second clutch 51b (or the first clutch 51a) is in the disengagement state. Thus, the engine power (the rotational power of the crankshaft 21) is not transmitted to the outer shaft 44 (or the inner shaft 43) and to the speed gear pair of the even step (or the odd step).

Thereafter, if determining that shift timing is reached, the electronic control unit 42 brings the first clutch 51a (or the second clutch 51b) into the disengagement state and the second clutch 51b (or the first clutch 51a) into the engagement state. Just only this operation allows the previous power transmission to switch into the power transmission using the speed gear pair corresponding to the previously selected, subsequent shift position. This enables quick and smooth shifting without the occurrence of the time lag and the disconnection of the power transmission during the shifting.

The clutch actuators 91a, 91b are solenoid valves, specifically, linear solenoid valves which change an operation amount proportionally to the change of supply current, and are operatable with good response even at a low electric current value. The hydraulic pressure supplied to the disk clutches 51a, 51b of the twin clutch 26 can be controlled by controlling electric current supplied to the clutch actuators 91a, 91b.

In the twin clutch transmission 23, in the state where the start of the motorcycle 1 is prepared (in other words, where the transmission device 47 uses the first-speed gear (the start gear, the speed gear pair 45a) to enable power transmission), the first disk clutch 51a connected to the start gear comes into the disengaged state for standby. In this state, a pulsed drive current D is supplied as control current to the first clutch actuator 91a as shown in FIG. 6(a).

Figure 6A:
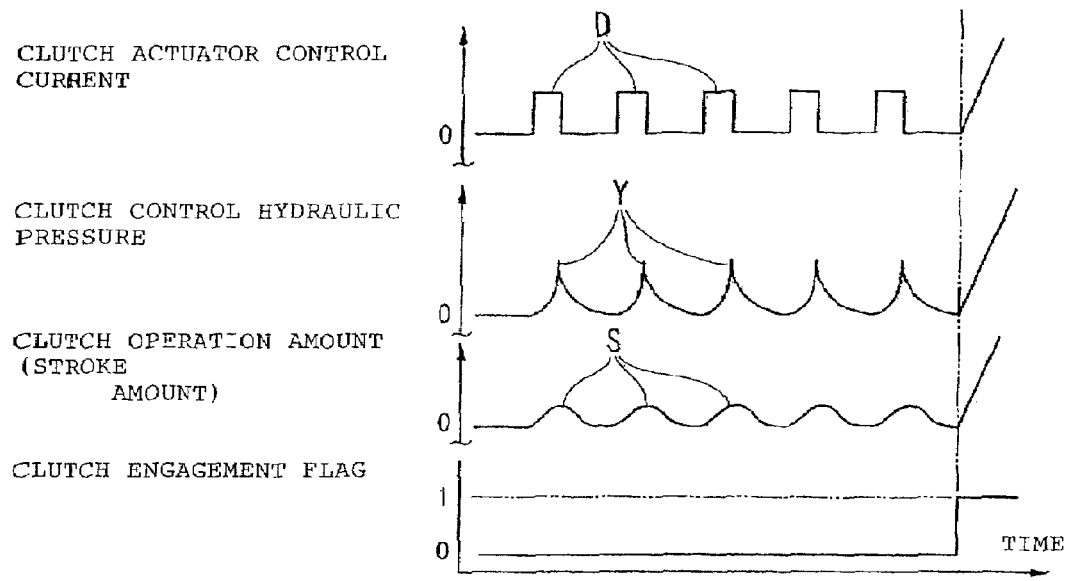
FIGS. 6(a) and 6(b) include graphs illustrating the control current of a clutch actuator, the control hydraulic pressure of a clutch, the operation amount of the clutch in the twin clutch speed-change control system, and time-change of a clutch engagement flag.

The amplitude value and frequency of the drive current D shown in FIG. 6(a) is constant. By supplying this drive current D to the first clutch actuator 91a, intermittent hydraulic pressure Y that steeply rises for each pulse of the drive current D is supplied to the connection side hydraulic chamber 54a of the first disk clutch 51a as the control hydraulic pressure for the first disk clutch 51a. Incidentally, the amplitude value and frequency (pulse interval) of the drive current D is set to such a degree that the intermittent hydraulic pressure Y can temporarily be returned to zero. The control hydraulic pressure for the first disk clutch 51a will not continue to increase for each pulse of the drive current D. The supply of the intermittent hydraulic pressure Y applies appropriate pulsation to the hydraulic oil (the engine oil) in the first oil supply passage 92a and the connection side hydraulic chamber 54a downstream of the first clutch actuator 91a.

Since the intermittent hydraulic pressure Y is supplied to the first disk clutch 51a, the pressure plate 52a of the first disk clutch 51a operates to undulately increase and decrease the operation amount (the stroke amount) S at every supply of the intermittent hydraulic pressure Y (i.e. for each pulse of the drive current D). Incidentally, the amplitude value and frequency of the drive current D is set to such a degree that the wavy operation amount S can temporarily be returned to zero. The operation amount S will not continue to increase for each pulse of the drive current D. The amplitude value of the hydraulic pressure Y supplied to the first disk clutch 51a is set to such a degree that the first disk clutch 51a is not brought into the engagement state (maintains the disengagement state).

If engine speed or a throttle opening angle reaches a predetermined value or more, from this state, the electronic control unit 42 sets a start flag (the clutch engagement flag) to start the supply of the predetermined electric current to the first clutch actuator 91a. As a result of this start, a predetermined hydraulic pressure is started to be supplied to the connection side hydraulic chamber 54a of the first disk clutch 51a, which allows the pressure plate 52a of the first disk clutch 51a to move toward the clutch engagement. This brings the first disk clutch 51a into the engagement state to enable the start of the motorcycle 1.

In this case, the pulsation is applied to the hydraulic oil in the connection side hydraulic chamber 54a of the first disk clutch 51a and in the first oil supply passage 92a. Thus, when a start command (a clutch engagement command) is issued from the electronic control unit 42, the supply of hydraulic pressure to the first disk clutch 51a is quickly started to suppress the delay of the engagement motion of the first disk clutch 51a.

Figure 6B:
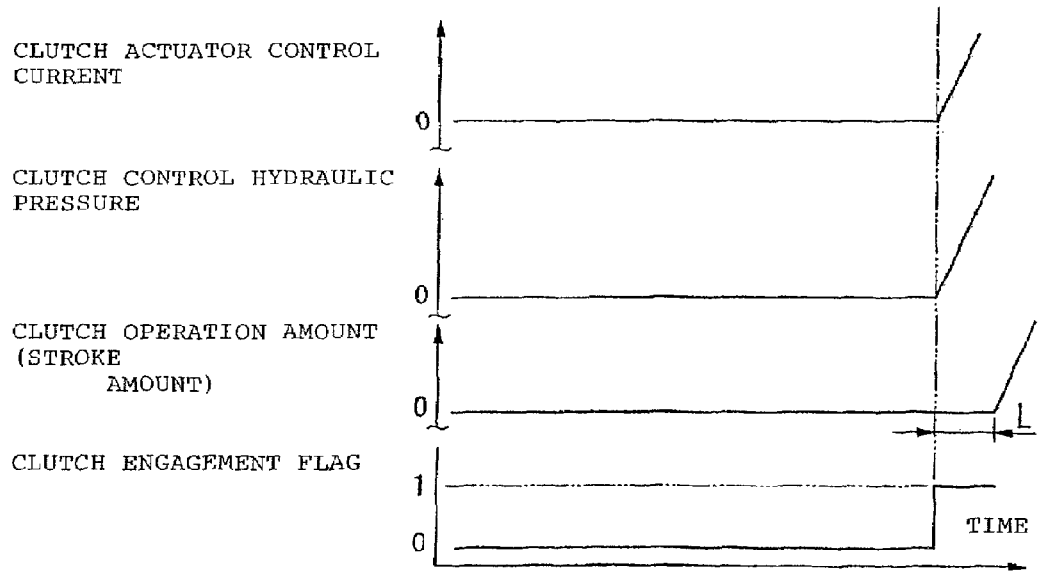

FIG. 6(b) illustrates the following case. In the engagement stand-by state of the first disk clutch 51a, a drive current is not supplied to the first clutch actuator 91a, that is, hydraulic pressure is not supplied to the first disk clutch 51a, whereby the first disk clutch 51a is not made to operate until the clutch engagement flag is on. In addition, after the clutch engagement command, a delay L occurs in the engagement motion of the first disk clutch 51a.

On the other hand, in the twin clutch transmission 23, the speed step of the transmission device 47 may be switched during the traveling of the motorcycle. In this case, the same pulsed-drive current D as in the start-up of the motorcycle 1 is supplied to the clutch actuator for one of the clutches standing by in the disengagement state. That is to say, the intermittent hydraulic pressure Y is supplied to the connection side hydraulic chamber of such a clutch to apply pulsation to the hydraulic pressure supplied to such a clutch.

From this state, if vehicle speed, engine speed or the like reaches a predetermined value or more, the electronic control unit 42 set a speed-change flag to start the supply of the predetermined electric current to the clutch actuator for such a clutch. The clutch comes into the engagement state and the supply of the predetermined electric current to the clutch actuator for the other clutch to bring such a clutch into the disengagement state. Thus, the power transmission using the speed gear pair corresponding to the previously selected subsequent shift position becomes switchable.

Also in this case, since the pulsation is applied to the hydraulic oil in the connection side hydraulic chamber of one of the clutches and in the first oil supply passage, when the electric control unit 42 issues a speed-change command, the supply of hydraulic pressure to such a clutch is quickly started to suppress the delay of the engagement motion of such a clutch.

In the twin clutch transmission 23, in the state where the start of the motorcycle 1 is prepared (in other words, where the transmission device 47 uses the first-speed gear (the start gear, the speed gear pair 45a) to enable power transmission), the first disk clutch 51a connected to the start gear comes into the disengaged state for standby. In this state, no current is supplied to the first clutch actuator 91a.

From this state, if engine speed reaches a predetermined value or more, the electronic control unit 42 sets a start flag (the clutch engagement flag) to start the supply of the predetermined electric current to the first clutch actuator 91a. As a result of this start, a predetermined hydraulic pressure is started to be supplied to the connection side hydraulic chamber 54a of the first disk clutch 51a, which allows the pressure plate 52a of the first disk clutch 51a to start to move toward the clutch engagement. This brings the first disk clutch 51a into the engagement state through a partial engagement state, starting the motorcycle 1.

Figure 8:
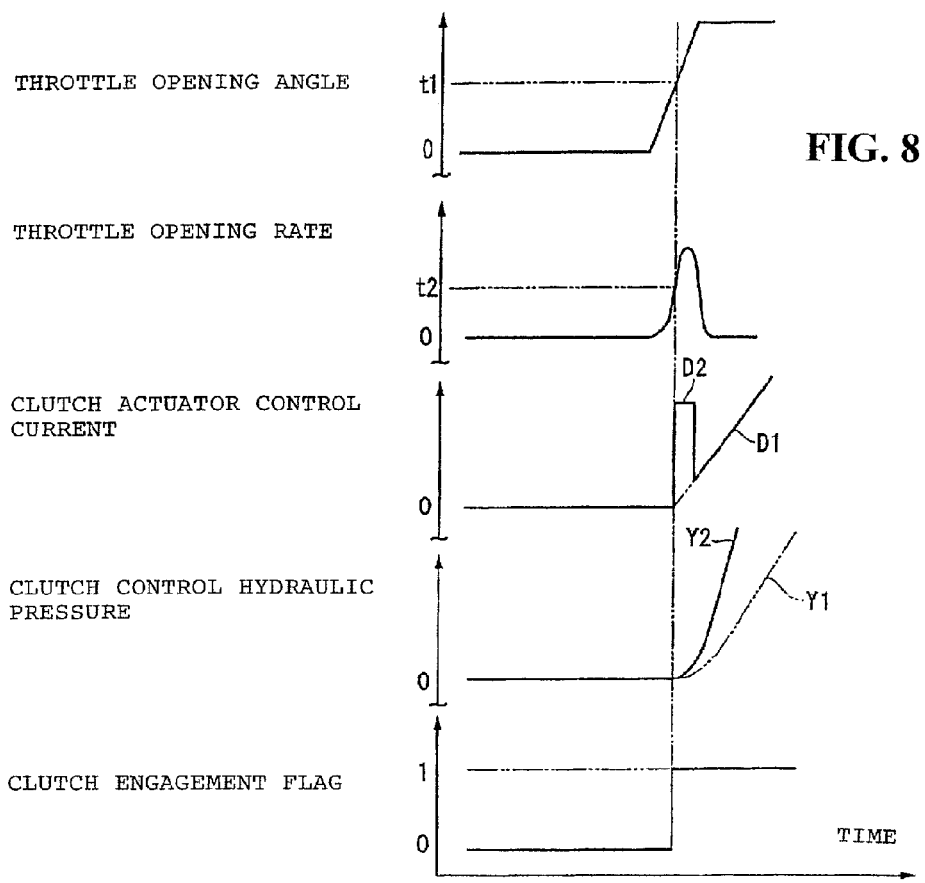
FIG. 8 includes graphs illustrating respective time variations of a throttle opening angle, a throttle opening rate, a clutch actuator control current, clutch control hydraulic pressure, and a clutch engagement flag.
Figure 9:
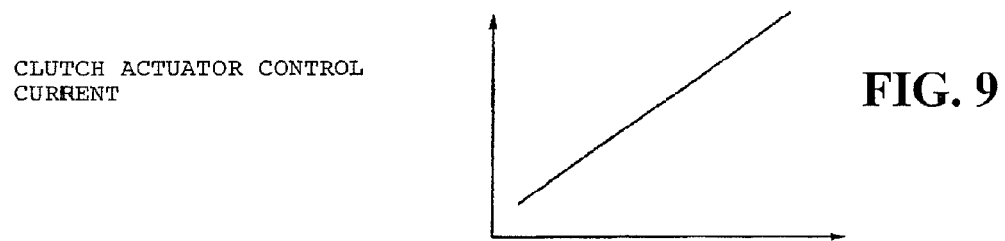
FIG. 9 is a graph illustrating a variation of the clutch actuator control current with respect to the throttle opening rate.

With reference to FIG. 8, to bring the first disk clutch 51a into the engagement state, the opening angle (throttle opening angle) of the throttle valve detected by the throttle sensor TS may be less than a predetermined value t1 (the throttle opening angle is small) or the opening rate of the throttle valve (the throttle opening rate) may be less than a predetermined t2 (the throttle valve may gradually be opened). In such a case, the control current that was not supplied to the first clutch actuator 91a up to that time linearly increases to be proportional to the lapse of time (the control current at this time is indicated with symbol D1 in the figure). The case where the opening angle or opening rate of the throttle valve is less than the predetermined value t1 or t2, respectively, is called "the throttle small-opening time".

On the other hand, to bring the first disk clutch 51a into the engagement state, the opening angle of the throttle valve detected by the throttle sensor TS may be not less than the predetermined value t1 (the throttle opening angle is large) and the opening rate of the throttle valve may be not less than the predetermined value t2 (the throttle valve is suddenly opened). In such a case, the steeply rising drive current D2 of one pulse is first supplied to the first clutch actuator 91a for a predetermined time and is then switched to the supply of control current D1, which relatively gently increases during the throttle small-opening time. At this switching time, the current supplied to the first clutch actuator 91a does not become a value equal to zero but becomes a value of the control current D1 encountered during the throttle small-opening time after the supply time of the one-pulse drive current D2 mentioned above elapses.

As described above, to bring the first disk clutch 51a into the engagement state, after the drive current D2 of one pulse is supplied to the first clutch actuator 91a, the control current D1 encountered during the throttle small-opening time is supplied. A rise of the control hydraulic pressure (indicated with symbol Y2 in the figure) for the first disk clutch 51a at this time is relatively steeper than that of the control hydraulic pressure (indicated with symbol Y1) for the first disk clutch 51a in the case of supplying the control current D1 encountered during the throttle small-opening time without the supply of the drive current D2 of one pulse. Thus, air-bleeding and application of pre-pressurization are performed on the inside of the first oil supply passage 92a downstream side of the first clutch actuator 91a and on the inside of the connection side hydraulic chamber 54a. This can suppress the delay of the engagement motion of the first disk clutch 51a.

Figure 7:
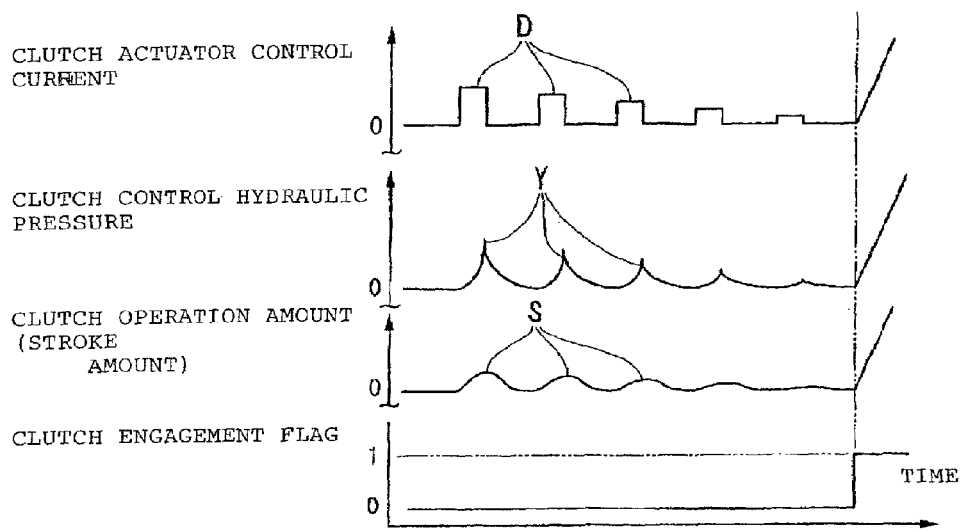
FIG. 7 is a graph illustrating a modification of the embodiment and corresponding to FIG. 6(a)

As shown in FIG. 7, the value of the one-pulse drive current D2 increases and decreases in proportion to the opening rate of the throttle valve. Specifically, if the opening rate of the throttle valve is steep, also the value of the one-pulse drive current D2 increases and the rise of the clutch control hydraulic pressure becomes steeper, which promptly executes the clutch engagement operation. Incidentally, the hydraulic pressure supplied to the first disk clutch 51a by the one-pulse drive current D2 can be suppressed to such a degree that the first disk clutch 51a is not brought into the engagement state (is maintained in the disengagement state).

In the twin clutch transmission 23, for example, when the engine speed reaches the predetermined value or more during the traveling of the motorcycle 1, the electronic control unit 42 sets a shifting flag. A predetermined current is started to be supplied to the clutch actuator associated with one of the clutches in the disengagement state and a predetermined current is stopped to be supplied to the clutch actuator associated with the other clutch in the engagement state. This brings the one of the clutches into the engagement state and the other into the disengagement state. Thus, the previous power transmission is switched to the power transmission corresponding to the previously selected, subsequent speed step. In this way, the switching of the speed steps of the transmission device 47 can be executed.

With reference to FIG. 8, to bring the one of the clutches into the engagement state, the opening angle of the throttle valve detected by the throttle sensor TS may be less than the predetermined value t1 or the opening rate of the throttle valve may be less than the predetermined value t2. In such a case, as with the time of starting, the control current D1 encountered during the throttle small-opening time is supplied to the one of the clutch actuators.

On the other hand, to bring the one of the clutches into the engagement state, the opening angle of the throttle valve detected by the throttle sensor TS may be not less than the predetermined value t1 and the opening rate of the throttle valve may be not less than the predetermined value t2. In such a case, as with the time of starting, the one-pulse drive current D2 is first supplied to the clutch actuator associated with the one of the clutches and is then switched to the supply of control current D1 encountered during the throttle small-opening time. Incidentally, the determination made by the electronic control unit 42 that the opening angle and opening rate of the throttle valve continues until, for example, the throttle opening angle becomes less than the predetermined value t1.

In this way, also at the time of switching the speed step of the transmission device 47, the one-pulse drive current D2 is supplied to the clutch actuator for the associated one of the clutches in the disengagement state and thereafter, the predetermined current is supplied to bring such a clutch into the engagement state. This can make the rise of the clutch control hydraulic pressure relatively steep, which can suppress the delay of the clutch engagement motion.

As described above, the clutch control apparatus for the motorcycle 1 according to the embodiment is provided with the hydraulic twin clutch 26 that is disposed in the middle of the power transmission path between the engine 13 and the rear wheel 11 and brought into the engagement state by the hydraulic pressure supplied from the outside. In addition, the clutch control apparatus, before one of the clutches of the twin clutch 26 is brought into the engagement state, applies the intermittent hydraulic pressure Y to such a clutch while maintaining it in the disengagement state and thereafter applies the predetermined hydraulic pressure to such a clutch to bring it into the engagement state.

According to this constitution, the supply of the intermittent hydraulic pressure Y applies the appropriate pulsation to the hydraulic pressure supplied to the clutch in the disengagement state. Thus, the motion delay at the time of engaging the clutch is suppressed, which allows quick and smooth start and shifting, thereby enhancing the drivability of the motorcycle 1.

Additionally, the clutch control apparatus is provided with the clutch actuators 91a, 91b for controlling hydraulic pressure supplied to the twin clutch 26. Hydraulic pressure supplied to the clutch actuators 91a, 91b is controlled to control the hydraulic pressure supplied to the twin clutch 26. Thus, the hydraulic pressure supplied to the twin clutch 26 can easily and reliably be controlled.

Further, the clutch control apparatus, before one of the clutches of the twin clutch 26 is brought into the engagement state, supplies the pulsed drive current D to the clutch actuator associated with such a clutch. Thus, appropriate pulsation can be applied to the hydraulic pressure supplied to the one of the clutches to efficiently suppress the delay of the engagement motion of such a clutch.

Furthermore, in the clutch control apparatus, the twin clutch 26 is used in a twin clutch speed-change control system in which a speed step is switched by switching the pair of clutches 51a, 51b. Thus, the twin clutch 26 in which the stand-by state is able to be present before the clutch engagement can suppress the motion delay at the time of switching the clutches to smooth the engagement motion of the twin clutch 26, thereby enhancing the drivability of the motorcycle 1.

As described above, the clutch control apparatus of the motorcycle 1 in the embodiment is provided with the hydraulic twin clutch 26 disposed in the middle of the power transmission path between the engine 13 and the rear wheel 11 and brought into the engagement state by the hydraulic pressure supplied from the outside. The clutch control apparatus includes the clutch actuators 91a, 91b adapted to control the hydraulic pressure supplied to the twin clutch 26 and the throttle sensor TS for detecting the opening angle and the opening rate of the throttle valve in the engine 13. When one of the clutches in the twin clutch 26 is to be brought into the engagement state, if the opening angle and opening rate of the throttle valve are not less than the predetermined values t1 and t2, respectively, the one-pulse drive current D2 is supplied to the clutch actuators 91a, 91b, and thereafter, the predetermined current is supplied to the clutch actuators 91a, 91b to shift such a clutch into the engagement state.

According to this constitution, when the one of the clutches are to be brought into the engagement state, the opening angle and opening rate of the throttle valve may be not less than the predetermined values t1 and t2, respectively. In such a case, the one-pulse drive current D2 is supplied to one of the clutch actuators 91a, 91b to bleed air from and apply the pre-pressurization to the inside of the clutch and of hydraulic path connected thereto. Thereafter, the predetermined current is supplied to the clutch actuators, whereby the predetermined hydraulic pressure is supplied to the clutch to bring it into the engagement state. Thus, the motion delay at the time of clutch engagement can be suppressed to enable prompt and smooth start and shifting, enhancing the drivability of the motorcycle 1.

Additionally, in the clutch control apparatus described above, the control current for the clutch actuators 91a, 91b increases and decreases in proportion to the opening rate of the throttle valve. Thus, the hydraulic pressure supplied to the twin clutch 26 can accurately be controlled in response to the opening rate of the throttle valve.

Further, in the clutch control apparatus described above, the hydraulic pressure supplied to one of the clutches in the twin clutch by the one-pulse drive current D2 is such a degree as not to bring such a clutch into the engagement state. Thus, the motion delay at the time of clutch engagement can efficiently be suppressed The present invention is not limited to the embodiment described above. For example, the amplitude value of the pulsed drive current D may gradually be reduced as shown in FIG. 7. In this case, the intermittent hydraulic pressure Y and the wavy operation amount S will gradually be reduced similarly to the above. According to such a constitution, the initial motion of the clutch engagement is accelerated and thereafter the hydraulic pulsation is gradually suppressed. Thus, the engagement motion of the twin clutch can quickly be executed by the stable hydraulic pressure. In addition, the power consumption of the clutch actuators 91a, 91b can further be reduced.

In addition, the present invention is not limited to the embodiment described above. For example, the supply of the one-pulse drive current D2 may be performed in response to one of the throttle opening angle and opening rate.

For another example, the transmission may have a single clutch instead of the twin clutch.

Examples of applicable engines include a single cylinder engine, a V-type engine, a horizontally-opposed engine, and a longitudinally-mounted engine with a crankshaft arranged to extend in the back and forth direction of a vehicle.

Further, the invention may be applied to a three- or four-wheeled saddle-ride type vehicle, or to a scooter-type vehicle having low-floor foot rest portions, as well as to motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch control apparatus for a vehicle provided with a hydraulic clutch disposed in a middle of a power transmission path between an engine and a drive wheel and brought into an engagement state by hydraulic pressure supplied from outside, wherein before the clutch is brought into the engagement state, an intermittent hydraulic pressure Y is applied to the clutch while maintaining the clutch in a disengagement state, and thereafter a predetermined hydraulic pressure is applied to the clutch to bring the clutch into the engagement state, the clutch control apparatus further comprising:
a gear change mechanism, and
a solenoid valve adapted to control the hydraulic pressure supplied to the clutch, the hydraulic pressure supplied to the clutch being controlled by controlling successive pulses of a pulsed drive current D supplied to the solenoid valve which in turn applies the intermittent hydraulic pressure Y,
wherein the intermittent hydraulic pressure Y operates to undulately increase and decrease an operation amount S of the gear change mechanism for each of the successive pulses of the pulsed drive current D,
wherein while the clutch is in the disengagement state, the intermittent hydraulic pressure Y temporarily returns to zero after each of the successive pulses of the pulsed drive current D.

2. The clutch control apparatus for a vehicle according to claim 1, wherein an amplitude value and frequency of the pulsed drive current D is set to such a degree that the undulating operation amount S temporarily returns the amplitude value to zero after each of the successive pulses of the pulsed drive current D.

3. The clutch control apparatus for a vehicle according to claim 2, wherein the operation amount S does not increase for each of the successive pulses of the pulsed drive current D.

4. The clutch control apparatus for a vehicle according to claim 2, wherein the clutch is a twin clutch of a twin clutch speed-change control system which switches a speed step by switching a pair of clutch main bodies.

5. The clutch control apparatus for a vehicle according to claim 1, wherein the pulsed drive current D for the solenoid valve increases and decreases in proportion to the opening rate of the throttle valve.

6. The clutch control apparatus for a vehicle according to claim 1, further comprising:
a throttle sensor for detecting an opening angle of a throttle valve of the engine,
wherein when the clutch is to be brought into the engagement state, if the opening angle of the throttle valve is less than a predetermined value, the hydraulic pressure supplied to the clutch by the pulsed drive current D of one pulse is such a degree as not to bring the clutch into the engagement state.

7. The clutch control apparatus for a vehicle according to claim 1, wherein the clutch is a twin clutch of a twin clutch speed-change control system which switches a speed step by switching a pair of clutch main bodies.

8. A clutch control apparatus for a vehicle provided with a hydraulic clutch disposed in a middle of a power transmission path between an engine and a drive wheel and brought into an engagement state by hydraulic pressure supplied from the outside,
wherein before the clutch is brought into the engagement state, an intermittent hydraulic pressure Y is applied to the clutch while maintaining the clutch in a disengagement state, and thereafter a predetermined hydraulic pressure is applied to the clutch to bring the clutch into the engagement state,
the clutch control apparatus further comprising:
a gear change mechanism, and
a solenoid valve adapted to control the hydraulic pressure supplied to the clutch, the hydraulic pressure supplied to the clutch being controlled by controlling successive pulses of a pulsed drive current D supplied to the solenoid valve which in turn applies the intermittent hydraulic pressure Y,
wherein the intermittent hydraulic pressure Y operates to undulately increase and decrease an operation amount S of the gear change mechanism for each of the successive pulses of the pulsed drive current D,
wherein an amplitude value and frequency of the pulsed drive current D is set to such a degree that the undulating operation amount S temporarily returns the amplitude value to zero after each of the successive pulses of the pulsed drive current D,
wherein the operation amount S does not increase for each of the successive pulses of the pulsed drive current D,
wherein in each of the successive pulses, the amplitude value of the pulsed drive current D is gradually reduced.

* * * * *